United States Patent [19]

Hofmeester

[11] 4,452,550

[45] Jun. 5, 1984

[54] METHOD AND APPARATUS FOR LAYING PIPELINES ON LAND

[75] Inventor: Paul M. Hofmeester, Rotterdam, Netherlands

[73] Assignee: Koninklijke Bos Kalis Westminster Group N.V., Paperdrecht, Netherlands

[21] Appl. No.: 282,013

[22] Filed: Jul. 10, 1981

[30] Foreign Application Priority Data

Jul. 11, 1980 [NL] Netherlands ......................... 8004022

[51] Int. Cl.³ .............................................. F16L 1/02
[52] U.S. Cl. .................................... 405/154; 405/158; 405/174
[58] Field of Search ............... 405/154, 155, 158, 174, 405/175, 182, 166; 414/545, 547, 548; 72/28, 388

[56] References Cited

U.S. PATENT DOCUMENTS

| | | | |
|---|---|---|---|
| 2,347,593 | 4/1944 | Cummings | 72/388 |
| 2,559,703 | 7/1951 | Bergman | 414/747 |
| 2,780,376 | 2/1957 | Sanders | 405/166 X |
| 3,335,588 | 8/1967 | Cummings | 72/28 |
| 3,396,565 | 8/1968 | Miller | 72/388 X |
| 3,744,259 | 7/1973 | Wagley | 405/174 |
| 3,834,210 | 9/1974 | Clavin et al. | 72/388 X |
| 3,900,146 | 8/1975 | Fowler | 405/174 X |
| 3,927,536 | 12/1975 | Sprenkel . | |
| 3,969,905 | 7/1975 | Dolza . | |
| 4,014,180 | 3/1977 | Kelly et al. | 414/747 |
| 4,091,629 | 5/1978 | Gunn et al. | 405/166 X |
| 4,313,330 | 2/1982 | Cummings | 72/388 X |

FOREIGN PATENT DOCUMENTS

| | | |
|---|---|---|
| 1263627 | 3/1968 | Fed. Rep. of Germany . |
| 862220 | 11/1940 | France . |
| 974000 | 9/1950 | France . |
| 93882 | 4/1960 | Netherlands . |

*Primary Examiner*—Dennis L. Taylor
*Attorney, Agent, or Firm*—Cushman, Darby & Cushman

[57] ABSTRACT

Method of laying pipelines on land, in which straight pipe pieces are aligned to each other above the trench route and are welded together, and the thus formed pipeline in welded condition is bent to an extent and in a direction defined by the trench route and subsequently is lowered down in a trench.

6 Claims, 5 Drawing Figures

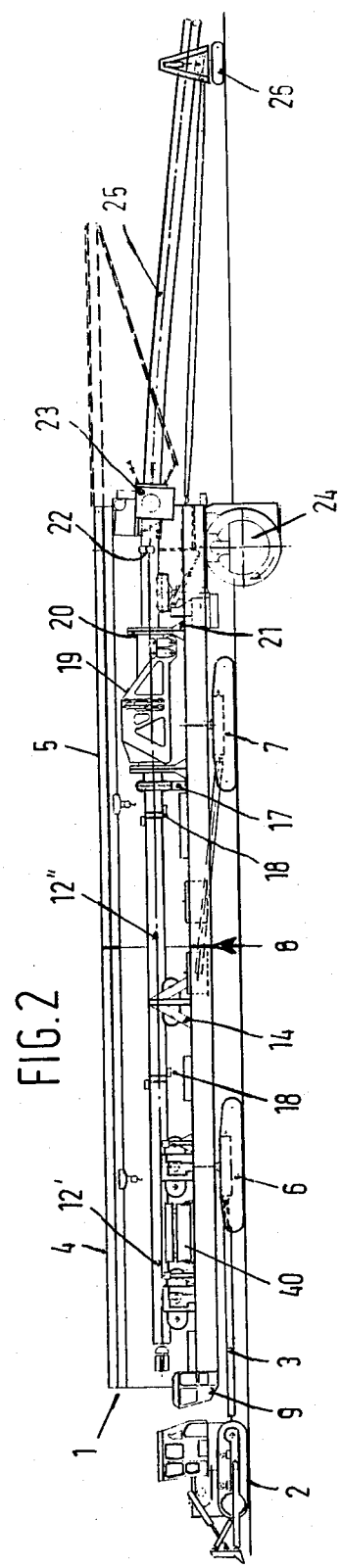

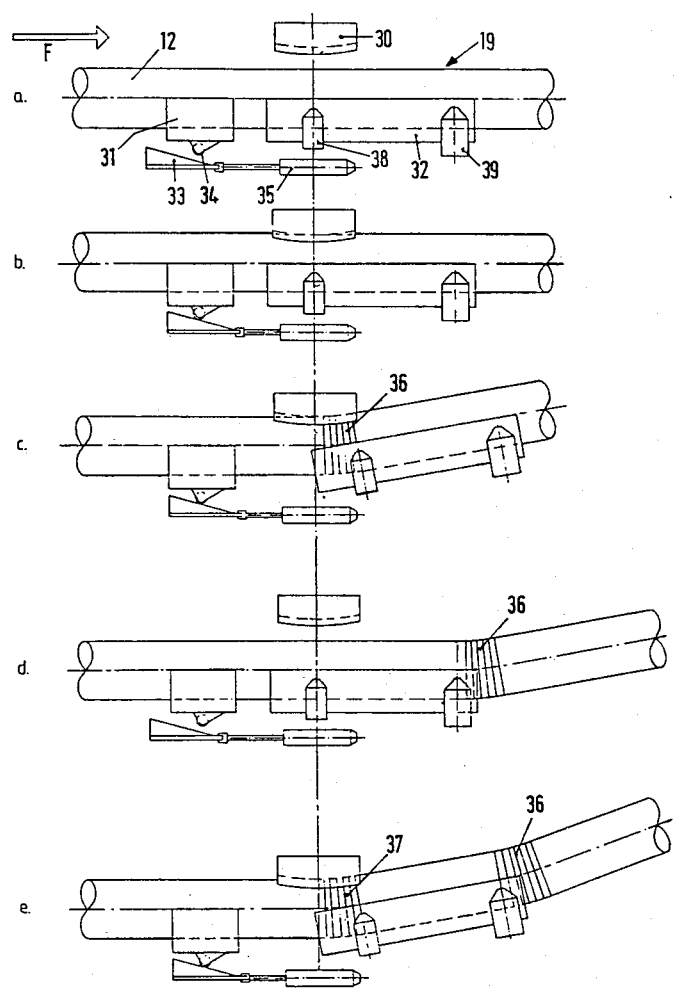

METHOD AND APPARATUS FOR LAYING PIPELINES ON LAND

The invention relates to a method of laying pipelines on land, in which straight pipe sections with pre-treated edges are aligned to each other adjacent a trench excavated or to be excavated, subsequently are welded together and lowered down into a trench, as well as to an apparatus for applying the method.

When laying pipelines, in particular very long oil or gas transmission lines of large diameter, such as 30 inch or more, there is actually employed a method which is substantially characterized by splitting up the operations in a number of sub-operations, which are carried out each by relatively small work parties, a wide section being assigned to each working party for performing certain operations, within which exclusively these operations are carried out. These sub-operations may consist e.g. of:

setting out the pipeline route;

the clearing of the site over a relatively substantial width, which is usually 25-30 m. This clearing includes e.g. the grading of the site where necessary, the stubbing of trees and bushes, the possible fencing of the routes, the bridging of water crossings and the building of supply routes in connection with the accessibility of the route in case of supply and discharge;

the excavation of a trench, which e.g. should be for a 30 inch pipeline at least 1.75 m in depth and over 1 m in width;

the supply of pipe sections, usually so-called double-joints, consisting of two 12 m pipe sections already welded together in the middle, which double-joints are conducted from a store or a double-joint workshop along the road to the trench route and are unloaded sequentially along the trench;

the cold bending of the bends which have to be made in the pipeline. To this effect, usually three-point pipe bending machines are applied;

the welding together of the successive pipe sections lined up by means of hoisting equipment;

the filling of the V-shaped weld seam;

the X-ray inspection of the weld;

the possible repair of welding defects;

the filling up of the installed pipeline;

the cleaning, painting and subsequent PVC-taping of the pipeline and its lateral positioning in the trench by means of hoisting gear;

the connection of particular bends or pipe sections, e.g. in case of crossings of motorways, railroads and rivers;

the backfill of the trench;

the hydraulic testing of the ready sections of the pipeline;

the restoration of the initially cleared route and the interconnection of hydraulically tested sections of the pipeline.

The crews occupied exclusively with one of the above described operations, work behind each other and each have a given section of the pipeline route for performing their operations. In order to avoid capacity frictions during the laying of the pipeline, there is the tendency to assign to each of these crews a sufficiently large route, so that they will be never hindered by the crew working in front of them, even when the pace of work in this front crew becomes lower for one reason or other than was initially anticipated. The total distance between the crew occupied with the clearing of the site and the crew cleaning up the site after the laying of the pipeline may thus be easily dozens of kilometers, while there is a tendency to substantially increase this distance to e.g. 100 km for the above indicated reason. This immediately entails the drawback of long transport lines of people and material, while the width of the route to be cleared is very large primarily since practically all operations have to take place beside the excavated trench, so that broadwise a number of meters of working space is required and besides again sufficient space for transport purposes.

U.S. Pat. No. 3,744,259 already proposes to perform the welding of a pipeline in a protected environment, in particular an articulated vehicle, and to lower the thus welded pipeline in a trench. Bends are prefabricated and welded in the vehicle. The vehicle consequently should have a substantial height and width, so that the transport along the road is hampered. Furthermore the vehicle requires vertically adjustable pipe support means.

It is the object of the invention to provide a method and an apparatus for employing this method, in which separate, straight pipe sections are welded together, while the thus welded pipeline is bent to an extent and in a direction as defined by the trench route.

The method according to the invention is preferably applied with the use of an apparatus consisting of a vehicle having a tubular loading space wherein are accommodated successively a pipe section storage rack, a series of movable pipe section supports for lining up the tandem-disposed pipe sections, one or more welding stations for welding together the lined up pipe sections and a pipeline bending station for bending the welded pipeline.

The bending of the loose pipe sections is known from U.S. Pat. No. 3,335,588. This apparatus however cannot be used for bending a welded pipeline of which the portion lying before the bending die should have a fixed centreline and should keep same during the bending.

Since the pipe laying vehicle in principle should be movable along the road, the vehicle is preferably divided according to a transverse median plane into two parts interconnectible in the working state, which transverse median plane is perpendicular to the direction of advancement of the vehicle, while both vehicle parts are supported by mobile supporting means, such as caterpillar tracks and are movable separately in the non-connected state. The transport height and width of the vehicle may in principle be kept within the allowed dimensions through application of telescopic portions of span and caterpillar tracks.

The pipeline bending station is accommodated in the rear vehicle part and comprises preferably two supporting dies and one bending die, provided in a support frame which is provided at both ends with attachment flanges which are rotatable in and connectible to mounting flanges supported in the rear vehicle part, while the bending die is positioned behind the two supporting dies seen in the direction of advance of the vehicle. In this manner it is achieved that exclusively that portion of the tube is bent which is oriented towards the back of the vehicle, while the pipe section projecting at the other side beyond the pipeline bending station continues to lie in a straight line.

In order to render the pipe laying vehicle suitable for broken ground and moreover to lay the pipeline in a bend, the supporting frame of the pipeline bending apparatus is disposed in the bearings, adapted for rotation through 360° about the axis of the pipeline, while upon rotation of the supporting frame likewise the line of action of the bending die is turned through the same angle. Thus it has become possible to apply a bend in the pipeline in any desired direction.

Besides the above indicated functions, the number of functions to be performed by the pipe laying vehicle can be extended. For instance, a weld inspection device may be provided on the second vehicle part behind the pipeline bending station, furthermore possibly an excavating wheel for excavating the trench or the clearing out of an already excavated trench and furthermore a coating station for cleaning and coating the pipeline with a protective layer.

This coating station for cleaning and coating the pipeline however may also be accommodated in a separate vehicle which is provided at the front and at the back with pipe supporting rollers for supporting the pipeline taken from the trench, while the coating station is provided between the pipe supporting rollers.

One embodiment of an apparatus suitable for application of the method according to the invention will now be described, by way of example, with reference to the accompanying drawings, wherein.

Figure 2:
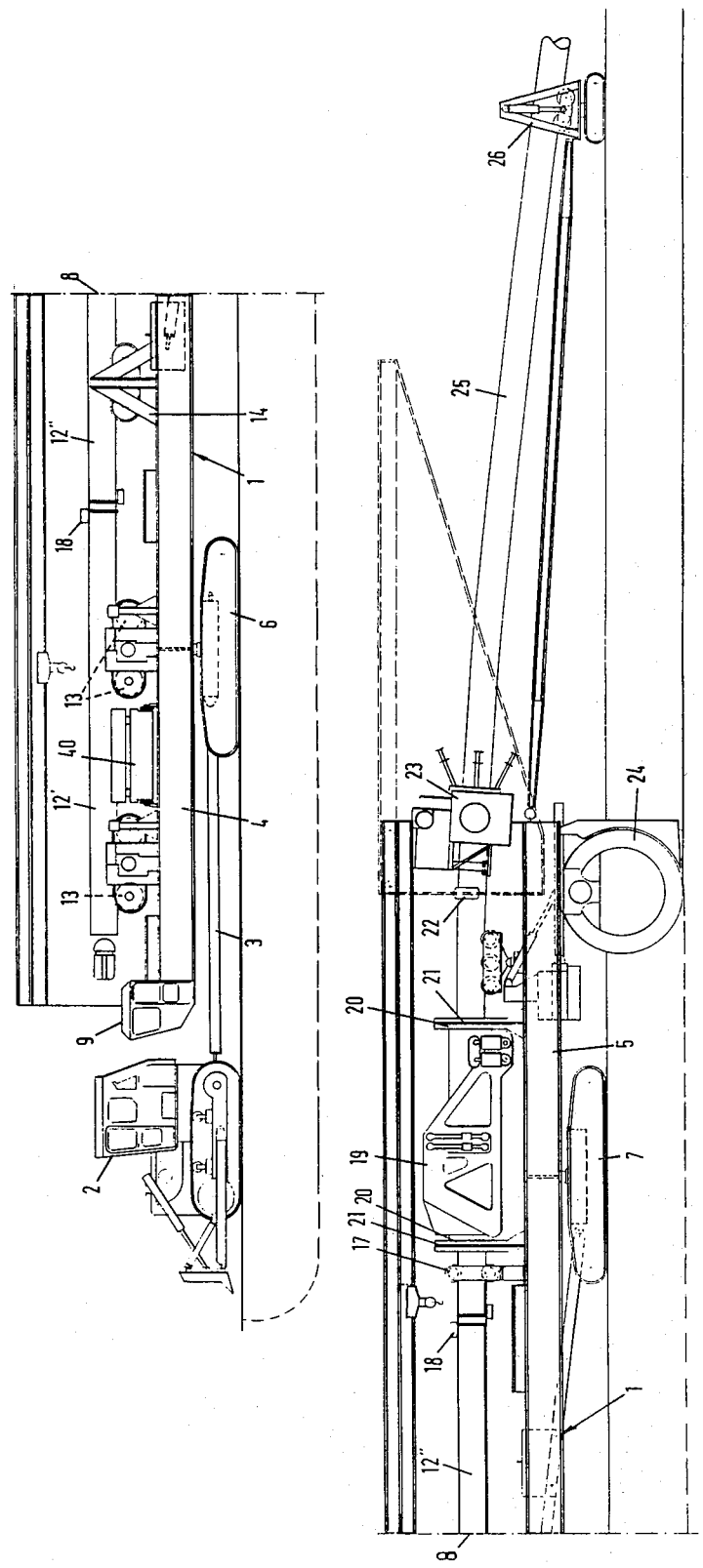
FIG. 2 is a side view of the vehicle shown in FIG. 1 with exploded sidewall.
Figure 3:
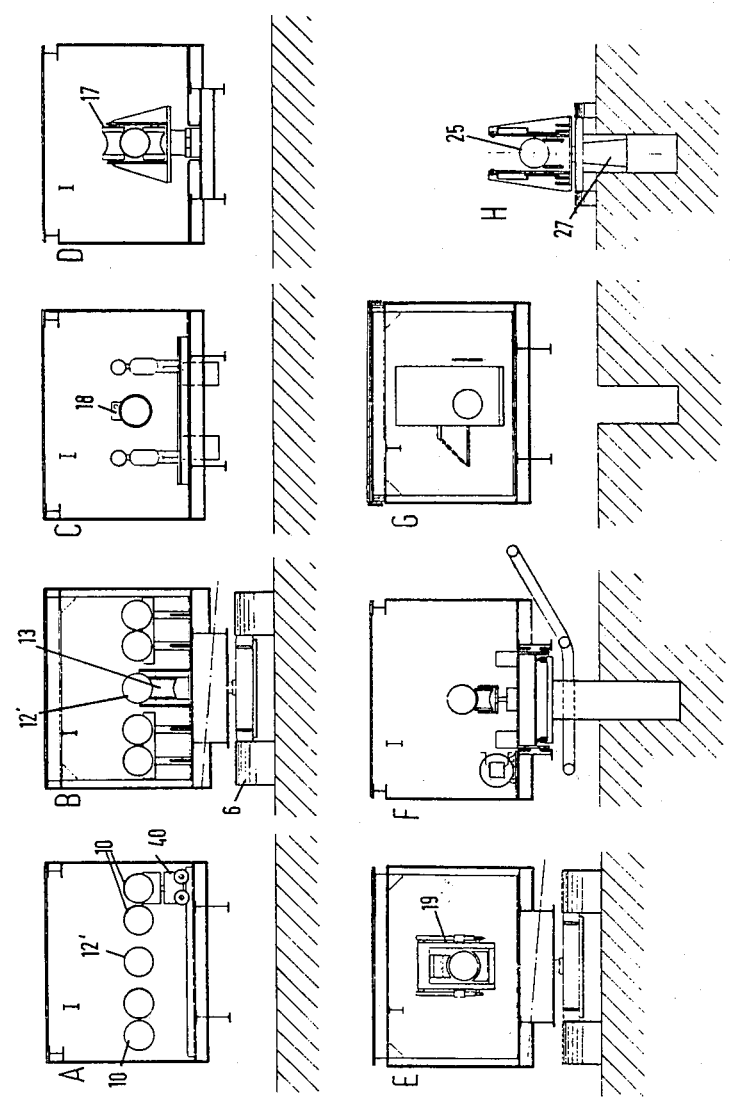

FIGS. 3A-H show different cross-sections of the pipe laying vehicle on the lines A-H represented in FIG. 2;

FIGS. 4a-e show the pipeline bending apparatus diagrammatically

Figure 1:
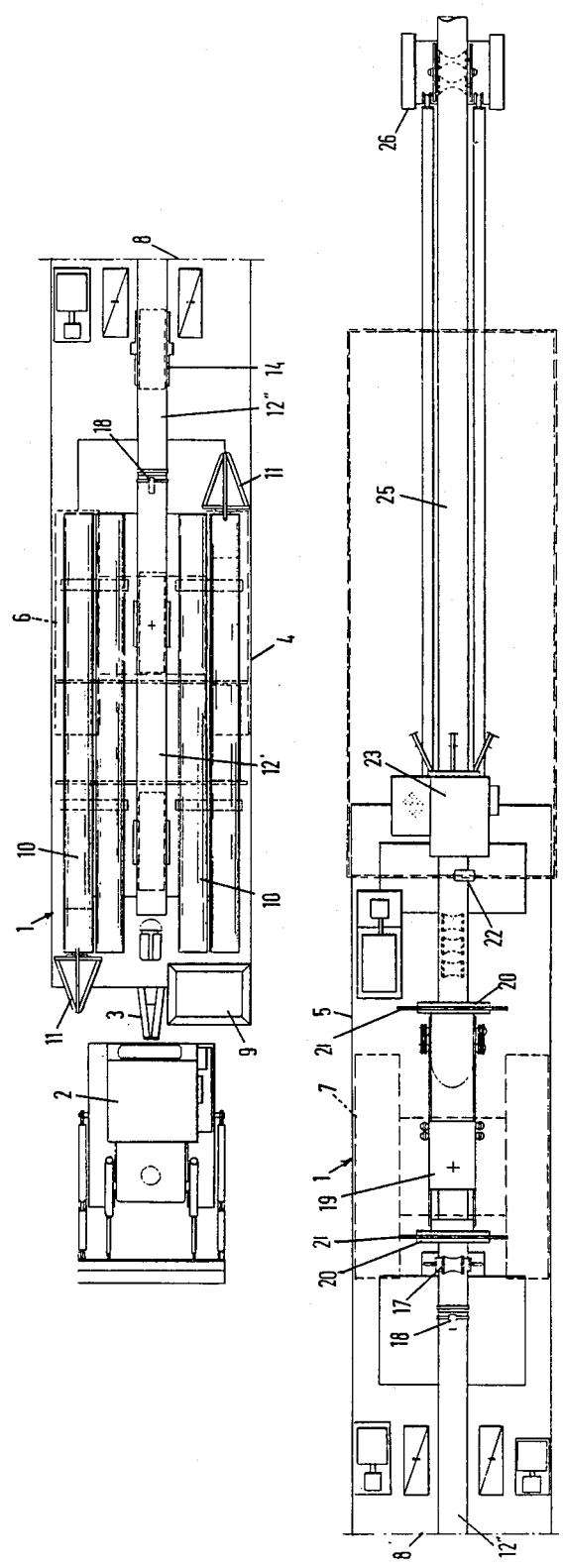
FIG. 1 is a top view of the pipe laying vehicle, while for clearness' sake the upper wall of the vehicle has been exploded.

In the Figures 1 indicates the pipe laying vehicle proper, which is pulled by a tractor 2 via a drawbar 3 which is suitably coupled to the vehicle 1. The vehicle 1 is divided according to the vertical transverse median plane 8 in a front part 4 and a back part 5, which both are supported by a set of caterpillar tracks 6, 7. The two vehicle parts 4 and 5 are separately movable, while they can be towed or move independently via a drive of the caterpillar tracks 6, 7 along the road. By 9 is indicated a driver's cabin for the front vehicle part 4. The total length of the vehicle 1 is e.g. 40 m, so that the length of the parts 4 and 5 each is 20 m. The total width is 5.4 m, which width may be reduced to 3.60 m, while the height in the working condition is 6.2 m, which height may be reduced e.g. to 4.1 m by lowering the roof of the vehicle 1.

The vehicle 1 comprises from the left to the right successively a pipe piece storage rack 10 wherein e.g. four pipe pieces, each having a 12 m length, may be stored for inspection. These pipe pieces may have already pretreated edges for applying the weld, however adjacent the pipe piece storage rack 10 there may also be provided a die head 11 for machining and bevelling the pipe edges. In the centre of the pipe piece storage rack 10 there are present a plurality of supporting rollers 13 (see FIG. 3B), on which a pipe piece 12' can be positioned e.g. by means of a cross travel lifting apparatus 40 for subsequently being aligned by the supporting rollers 13 adjustable in three directions to the preceding pipe piece 12" (see FIG. 2). The pipe piece 12" finds support on a vertically variable pipe supporting apparatus 14. The pipe pieces 12' and 12", when properly aligned relatively to each other, are clamped by means of clamps at the proper distance relative to each other by suitable and conventional means 18, after which by means of an automatic or non-automatic welding apparatus, the first joint between the two pipe pieces 12' and 12" is effected. At a second and possibly third welding station the V-shaped groove is subsequently entirely filled with beads.

In the rearmost vehicle part 5 there is furthermore present a pipeline bending machine 19, which will be further described in the following. Just before the bending apparatus 19 there is provided a supporting apparatus 17 provided with two diabolo-shaped rollers, one underneath and one above the pipeline. The upper roller serves for keeping within acceptable limits the travel of the pipeline upwards as a result of the sinking of the pipeline in the trench through gravity behind the vehicle.

The pipeline bending machine 19 is provided at the front and at the back end with an attachment flange 20 which is naturally fitted with an opening for the passage of the pipeline. The two attachment flanges 20 are mounted in the flanges 21, which are naturally likewise provided with a passage for the pipeline and which are supported on the bottom of the rearmost vehicle part 5. The pipeline bending machine is rotatable bilaterally through 180° about the pipeline, while the flanges 20 and 21 in four positions can be interconnected with 90° interspace. Behind the pipeline bending machine 19 there may be provided a weld inspection apparatus 22, as well as a coating station 23 for cleaning and coating the pipeline with a protective layer. Such coating apparatus are known per se and are likewise employed during the laying of pipelines according to the actually conventional methods.

At the bottom side of the rearmost vehicle part 5 there may be provided an excavating wheel 24 which may be used in suitable soft soil for excavating the trench. The excavating wheel 24, however, may also be utilized for clearing out an already excavated trench. The pipeline 25 projecting behind the pipe laying vehicle 1 in principle sinks in the excavated trench through gravity, while the pipeline 25 is subjected to an elastic deformation. To keep the pipe geometry within the required tolerances and to prevent in particular that the deflecting pipeline 25 imparts to the pipe section in the rearmost vehicle part 5 too large a travel in upward direction, it is desirable to take up the pipeline 25 at substantial distance from the vehicle in a supporting apparatus 26 coupled to the vehicle. The supporting apparatus 26 is provided at the bottom with a guide 27 extending in the trench (see FIG. 3H) to ensure that the supporting apparatus 26 continues to follow the flange. Said trench is e.g. for a 30 inch pipeline about 1 m in width and about 1.7 m in depth.

FIGS. 4a-e diagrammatically show the pipeline bending apparatus 19, as well as its operation. In FIG. 4, the supporting frame of the bending machine, as well as the laterally disposed flanges have been omitted for the sake of clarity. In the bending machine there are present three dies: one stationary supporting die 30 which is disposed above the pipeline 12 and which has a rounded abutting face for the pipeline 12 having a radius that is basically equal to 40× the pipe diameter. Underneath the pipeline 12 there is provided a supporting die 31 fitted at the bottom with a hold-down roller 34 adapted to find support on a horizontally movable wedge 33 the horizontal movement of which is obtained with a hydraulic cylinder 35. By 32 is indicated a pivotal die through which the pipeline can be bent about the die 30. A 30 inch pipe may be bent along a length of 30 cm through about a ½°. The pipe traversing direction is indicated in FIG. 4a by arrow F.

Also when the pipeline is laid in a straight route, the pipe traverses the bending apparatus 19. Bends having a radius of curvature of about 500 m may be laid in a pipeline having a 30 inch diameter by elastic bending of the pipeline. Bends having a smaller radius of curvature than 500 m can only be obtained through application of the bending apparatus 19. The bending is then effected as follows:

The pipeline 12 (see FIG. 4b) is lifted and pressed against the die 30. This lifting is effected by energizing the hydraulic cylinder 35, so that the wedge 33 comes to abut against the supporting wheel 34, thereby pressing the die 31 upwards. The same is done with the die 32, also called "stiff back", by lifting the inner cylinder 38. Subsequently, the cylinder 39 is energized, so that the "stiff back" 32 pivots upwardly, whereby the pipeline 12 is bent over the die 30. In order to maintain a round pipe diameter during the bending of the pipe and consequently not to press the pipe in oval shape, the die 32 should have a predetermined length, which, depending on the admissible surface pressure, is about 1-2 m, also called "stiff back" length. After a first bend the pipeline 12 should consequently be advanced over the "stiff back" length in order to apply a second bend (see FIGS. 4d-e). The number of bends that can be made in a 12 m pipe piece is consequently depending on the required "stiff back" length, while it will be clear that no bending should take place in situ of a recently applied weld, but that on either side of a weld at least a certain straight length of about 1 m is to be maintained. With a stiff back length of e.g. 2 m, a pipe piece of 12 m may be bent through 3°, so that bends with a radius of curvature of 230 m may be applied. By shortening the stiff back length or by removably applying therein of means (packing pieces) for better supporting bent pipe pieces, this radius of curvature can possibly be further reduced. For short, substantially right-angled bends, such as for road of channel crossings, separately bent pipe bends have to be employed.

The steerability of the vehicle 1 is sufficient when the front caterpillar tracks 6 are rendered steerable and the rear caterpillar tracks 7 are fixed. By means of a simple hydraulic trimming system that is operative on the working floor of the vehicle 1, it is possible to achieve a bank compensation to 6°.

As already indicated in the above, the coating machine may be applied on a separate vehicle, so that uncoupling is achieved between the welding-bending vehicle and the coating vehicle. This coating vehicle rides over the trench wherein the pipeline has already been installed. True, in principle the speed of the machine used for the application of a coating is much higher than the speed of advance of the welding-bending vehicle, which speed is substantially determined by the welding speed, however it has been found that the number of disturbances occurring with the coating machines is much larger than the disturbances occurring with the welding-bending vehicle, so that uncoupling of the above operations may be desirable. Instead of the coating station, a third welding station may be applied on the rear vehicle part 5.

I claim:

1. Apparatus for welding straight lengths of pipe end-to-end at a location above a trench, bending the thus formed welded pipeline to fit the trench and lowering the bent pipeline into the trench comprising a vehicle divided in two interconnectible parts on opposite sides of a transverse median plane which is perpendicular to the direction of advance of the vehicle, both vehicle parts being supported by mobile supporting means and in the non-connected condition being separately displaceable, said vehicle having a tubular loading space wherein are successively exposed a pipe piece storage rack, a series of movable pipe piece supports for aligning the tandem-disposed pipe pieces, one or more welding stations for welding together the aligned pipe pieces and a pipeline bending machine for bending the welded pipeline, said bending machine being accommodated in the rear vehicle part, comprising two supporting dies and one bending die, disposed in a supporting frame, which supporting frame is provided at the two ends with attachment flanges which are rotatable in and connectible to bearings supported in the rear vehicle part, the bending die, seen in the direction of advance of the vehicle, being positioned behind the two supporting dies so that a substantially fixed and straight centerline of the pipeline portion being welded is created ahead of the bending machine and during the bending process the moving pipeline portion is present in and behind the bending machine.

2. Apparatus according to claim 1, characterized in that the supporting frame of the pipeline bending machine is disposed in the mounting flanges, adapted for rotation through 360° about the axis of the pipeline, while upon rotation of the supporting frame likewise the line of action of the bending die is rotated through the same angle.

3. Apparatus according to claim 1 including a weld inspection apparatus on the second vehicle part behind the pipeline bending station.

4. Apparatus ascording to claim 1 wherein the second vehicle part is provided with an excavating wheel for excavating the trench.

5. Apparatus according to claim 1 wherein the second vehicle part is provided with a coating station for cleaning and coating the pipeline with a protective layer.

6. Apparatus according to claim 1 wherein a coating station is accommodated in a separate vehicle which is provided at the front and at the back with pipe supporting rollers for supporting the pipeline removed from the trench, while the coating station is provided between the pipe supporting rollers.

* * * * *